(12) United States Patent
Li

(10) Patent No.: US 12,185,715 B2
(45) Date of Patent: Jan. 7, 2025

(54) PORTABLE MOSQUITO DISPELLER

(71) Applicant: KEENSTONE CORPORATION, Milpitas, CA (US)

(72) Inventor: Zhongrun Li, Yongzhou (CN)

(73) Assignee: KEENSTONE CORPORATION

( * ) Notice: Subject to any disclaimer, the term of this patent is extended or adjusted under 35 U.S.C. 154(b) by 790 days.

(21) Appl. No.: 17/471,224

(22) Filed: Sep. 10, 2021

(65) Prior Publication Data

US 2023/0084442 A1    Mar. 16, 2023

(51) Int. Cl.
*A01M 29/12*    (2011.01)
*B05B 11/00*    (2023.01)

(52) U.S. Cl.
CPC ......... *A01M 29/12* (2013.01); *B05B 11/0002* (2013.01); *B05B 11/0037* (2013.01)

(58) Field of Classification Search
CPC . A01M 29/12; B05B 11/0002; B05B 11/0037
See application file for complete search history.

(56) References Cited

U.S. PATENT DOCUMENTS

| | | | |
|---|---|---|---|
| 2008/0308647 A1* | 12/2008 | Maget | A01M 1/2044 239/34 |
| 2011/0057051 A1* | 3/2011 | Wang | A01M 1/2088 239/34 |
| 2024/0180139 A1* | 6/2024 | Hainze | A01M 1/2061 |

* cited by examiner

*Primary Examiner* — Shawntina T Fuqua
(74) *Attorney, Agent, or Firm* — Jose Cherson Weissbrot

(57) ABSTRACT

A novel portable mosquito dispeller comprises a shell, wherein a battery case is fixedly mounted in the shell, a battery is received in the battery case, a lower portion of the battery case is flat, a base is screwed at a bottom of the shell such that receiving cavities for receiving mosquito-repellent mats are defined by the battery case, the shell and the base, first studs and second studs are disposed on an upper portion of the battery case, a circuit board is fixedly connected to the first studs with screws and is provided with atmosphere lights, an indicator light and a switch button, a top cover is fixed to the second studs with screws to mount a PTC heating element/heating film bracket between the circuit board and the top cover, and a PTC heating element/heating film electrically connected to the circuit board is disposed in the PTC heating element/heating film bracket. The mosquito dispeller is compact in structure, easy to assemble and low in production cost, uses the battery as a power supply, adopts environmentally-friendly PTC to convert electric energy into heat energy to heat mosquito-repellent mats to be volatilized to dispel mosquitoes, and is convenient to carry, exquisite in appearance, and capable of meeting diversified market requirements.

7 Claims, 3 Drawing Sheets

PORTABLE MOSQUITO DISPELLER

BACKGROUND OF THE INVENTION

1. Technical Field

The invention relates to a novel portable mosquito dispeller.

2. Description of Related Art

In summer, mosquitoes breed, are rampant, and bite the skin of people, which in turn causes pain and itching, reduces sleep quality, and leads to the spread of diseases to some extent. It is an effective approach to prevent and reduce diseases by killing mosquitoes. At present, traditional incense coils, electric mosquito-repellent incense or electric mosquito-repellent liquor is used to dispel and kill mosquitoes. However, traditional incense coils are directly ignited with a flame, thus being unsafe to use. The electric mosquito-repellent incense and the electric mosquito-repellent liquor has to be plugged into a power supply when used, which involves plugging and unplugging operations before and after use, thus being inconvenient to use, merely suitable for places where a power supply is available, high in power consumption and not environmentally friendly.

Thus, mobile mosquito dispellers are developed. A PTC heating element/heating film is driven by a battery inside the mosquito dispellers to generate heat to heat mosquito-repellent mats. However, existing mobile mosquito dispellers are simple in structure and have only one function, thus being unable to meet diversified market requirements.

BRIEF SUMMARY OF THE INVENTION

The objective of the invention is to overcome the above-mentioned defects by providing a novel portable mosquito dispeller.

To fulfill the above objective, the invention provides a novel portable mosquito dispeller novel portable mosquito dispeller comprising a shell, wherein a battery case is fixedly mounted in the shell, a battery is received in the battery case, a lower portion of the battery case is flat, a base is screwed at a bottom of the shell such that receiving cavities for receiving mosquito-repellent mats are defined by the battery case, the shell and the base, first studs and second studs which are integrally formed upwards are disposed on an upper portion of the battery case, a circuit board is fixedly connected to the first studs with screws and is provided with atmosphere lights, an indicator light and a switch button, a top cover is fixed to the second studs with screws to mount a PTC heating element/heating film bracket between the circuit board and the top cover, and a PTC heating element/heating film electrically connected to the circuit board is disposed in the PTC heating element/heating film bracket.

The mosquito dispeller is compact in structure, easy to assemble and low in production cost, and uses a battery as a power supply, adopts environmentally-friendly PTC to convert electric energy into heat energy to heat mosquito-repellent mats to be volatized to repel mosquitoes, and is convenient to carry and long in mobile discharge time.

Preferably, the battery is wrapped with fireproof asbestos and is mounted in the battery case in a close fit manner.

In this technical solution, the fireproof asbestos fulfills a safety fire-prevention effect, and the battery is mounted in the close fit manner, such that the stability of the operating environment of the battery is guaranteed.

Preferably, a non-slip gasket is disposed on a lower surface of the base.

In this technical solution, the non-slip gasket fulfills a non-slip effect, such that the mosquito dispeller can be stably placed on a desk.

Preferably, the shell is provided with an indicator light cover and a key, the indicator light cover corresponds to the indicator light in position, and the key corresponds to the switch button in position.

In this technical solution, whether power is normally supplied to the battery can be visually observed by means of the indicator light cover, and on-off of the mosquito dispeller can be directly controlled by means of the key.

Preferably, the indicator light cover is close to the key, and the shell is provided with a charging port opposite to the key.

In this technical solution, the indicator light cover is close to the key such that assembly is easy, and the battery can be charged by means of the charging port.

Preferably, colored light covers are disposed at positions, corresponding to the atmosphere lights, of the PTC heating element/heating film bracket, and are fastened on the PTC heating element/heating film bracket in a hooked manner.

In this technical solution, the colored light covers are used in cooperation with the atmosphere lights to create a colored light effect to attract mosquitoes.

Preferably, the top cover is provided with a through hole allowing the mosquito-repellent mats to be placed therein, and multiple diffusion holes are machined in a top surface of the top cover.

In this technical solution, the vapor of the heated mosquito-repellent mats can be diffused into air rapidly via the diffusion holes, such that the mosquito dispelling effect is good, and uniform diffusion is realized.

Compared with the prior art, the invention has the following beneficial effects: existing mobile mosquito dispellers are too simple; and the novel portable mosquito dispeller is compact in structure, easy to assemble and low in production cost, and uses the battery as a power supply, adopts environmentally-friendly PTC to convert electric energy into heat energy to heat mosquito-repellent mats to be volatized to repel mosquitoes, realizes uniform diffusion, and is suitable for home use, convenient to carry, long in mobile discharge time, exquisite in appearance, and capable of meeting diversified market requirements.

In the figures: 1, top cover; 1a, through hole; 1b, diffusion hole; 2, PTC heating element/heating film; 3, colored light cover; 4, PTC heating element/heating film bracket; 5, circuit board; 6, atmosphere light; 7, indicator light; 8, switch button; 9, battery; 10, battery box; 101, first stud; 102, second stud; 11, shell; 12, indicator light cover; 13, key; 14, base; 15, non-slip gasket; 16, receiving cavity.

DETAILED DESCRIPTION OF THE INVENTION

Figure 1:
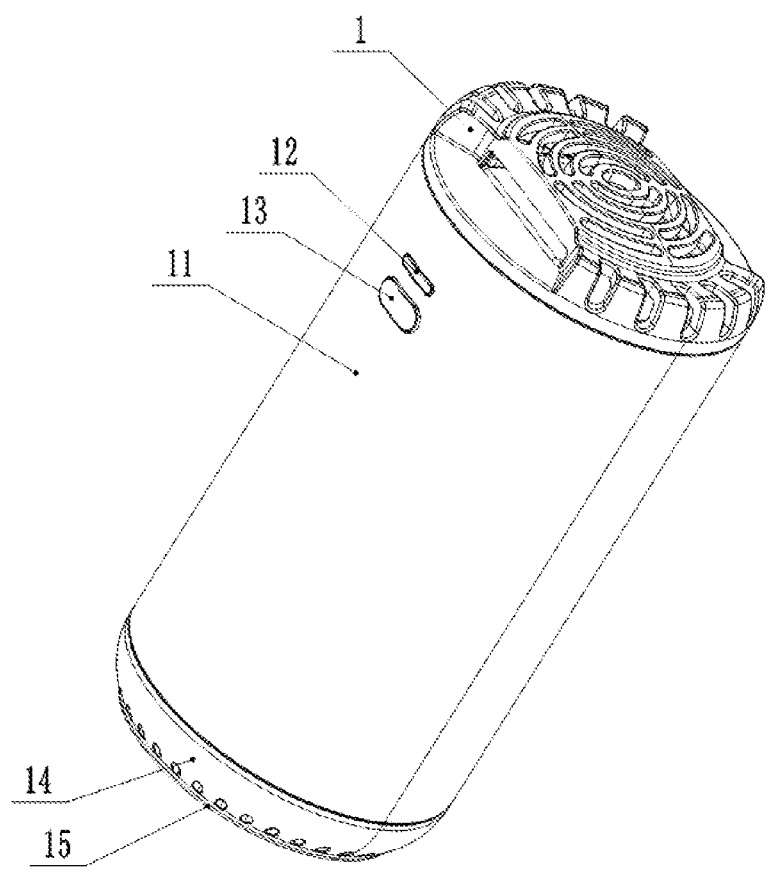
FIG. 1 is a solid diagram of a novel portable mosquito dispeller of the invention.
Figure 2:
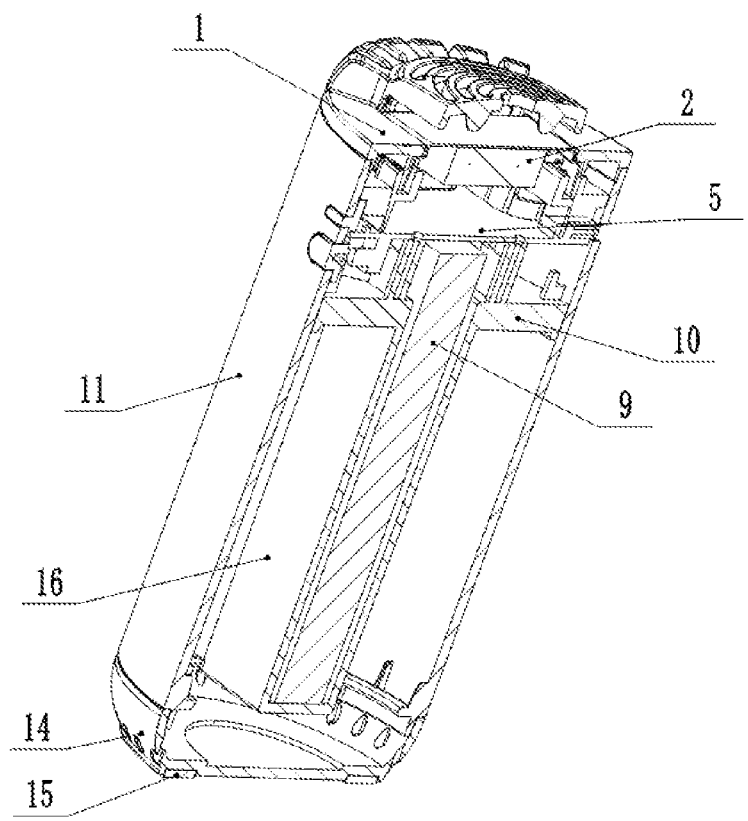
FIG. 2 is a sectional view of a novel portable mosquito dispeller of the invention.
Figure 3:
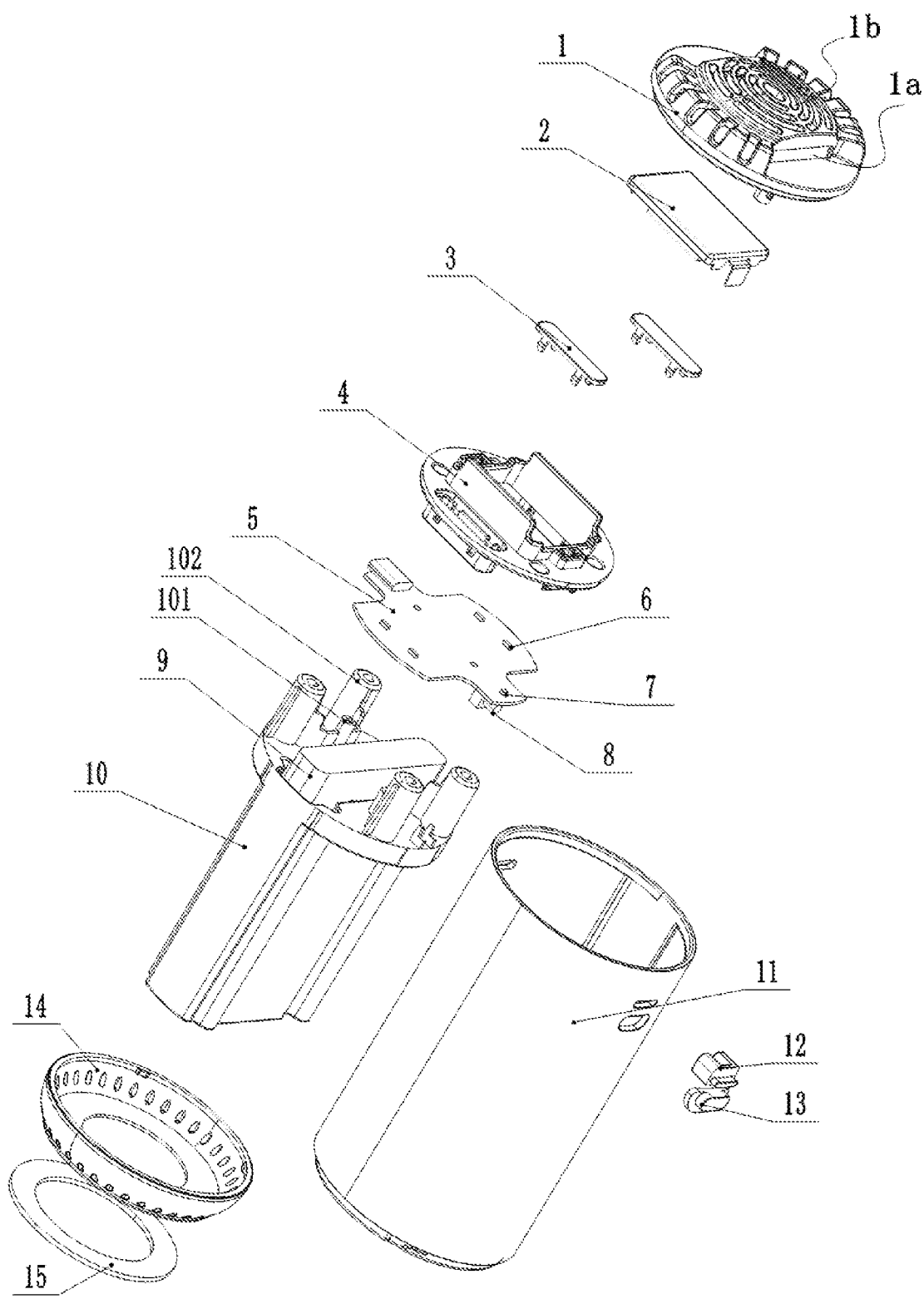
FIG. 3 is an exploded view of the novel portable mosquito dispeller of the invention.

As shown in FIG. 1, FIG. 2 and FIG. 3, one embodiment of the invention provides a novel portable mosquito dispeller comprising a shell 11, wherein a battery case 10 is fixedly mounted in the shell 11, a battery 9 is received in the battery case 10, a lower portion of the battery case 10 is flat, a base 14 is screwed at a bottom of the shell 11 such that receiving cavities 16 for receiving mosquito-repellent mats is defined by the battery case 10, the shell 11 and the base 14, first studs 101 and second studs 102 which are integrally formed upwards are disposed on an upper portion of the battery case 10, a circuit board 5 is fixedly connected to the first studs 101 with screws and is provided with atmosphere lights 6, an indicator light 7 and a switch button 8, a top cover 1 is fixed to the second studs 102 with screws to mount a PTC heating element/heating film bracket 4 between the circuit board 5 and the top cover 1, and a PTC heating element/heating film 2 electrically connected to the circuit board 5 is disposed in the PTC heating element/heating film bracket 4; wherein, the battery 9 is wrapped with fireproof asbestos, the battery 9 is mounted in the battery case 10 in a close fit manner, the fireproof asbestos fulfills a safety fire-prevention effect, and the battery is mounted in the close fit manner, such that the stability of the operating environment of the battery is guaranteed; and a non-slip gasket 15 is disposed on a lower surface of the base 14 to fulfill a non-slip effect, such that the mosquito dispeller can be stably placed on a desk; an indicator light cover 12 and a key 13 are disposed on the shell 11; the indicator light cover 12 corresponds to the indicator light 7 in position, the key 13 corresponds to the switch button 8 in position, whether power is normally supplied to the battery can be visually observed by means of the indicator light cover, and on-off of the mosquito dispeller can be directly controlled by means of the key; the indicator light cover 12 is close to the key 13, the shell 11 is further provided with a charging port opposite to the key 13, the indicator light cover is close to the key such that assembly is easy, and the battery can be charged by means of the charging port; colored light covers 3 are disposed at positions, corresponding to the atmosphere lights 6, of the PTC heating element/heating film bracket 4, are fastened on the PTC heating element/heating film bracket 4 in a hooked manner, and are used in cooperation with the atmosphere lights to create a colored light effect to attract mosquitoes; a through hole 1a allowing the mosquito-repellent mats to be placed therein are formed in the top cover 1, and a plurality of diffusion holes 1b are machined in a top surface of the top cover 1 to allow the vapor of the heated mosquito-repellent mats to be diffused into air rapidly, such that the mosquito dispelling effect is good, and uniform diffusion is realized.

Existing mobile mosquito dispellers are too simple. The novel portable mosquito dispeller is compact in structure, easy to assemble and low in production cost, and uses the battery as a power supply, adopts environmentally-friendly PTC to convert electric energy into heat energy to heat mosquito-repellent mats to be volatized to repel mosquitoes, realizes uniform diffusion, and is suitable for home use, convenient to carry, long in mobile discharge time, exquisite in appearance, and capable of meeting diversified market requirements.

To gain a better understanding of the invention during specific use, the novel portable mosquito dispeller will be described in conjunction with the accompanying drawings.

The mosquito dispeller has two receiving cavities capable of receiving multiple mosquito-repellent mats; during use, the base is rotated out to take out one mosquito-repellent mat, then the base is rotated back, the mosquito-repellent mat is inserted into the through hole 1a in the top cover, the key 13 is pressed, the indicator light and the atmosphere lights are turned on, the mosquito-repellent incense is heated by the PTC heating element/heating film to be evaporated to generate vapor which is then diffused out via the diffusion holes, and the atmosphere lights and the colored light covers are able to attract mosquitoes to approach the mosquito dispeller to be killed by the vapor.

The above embodiments are merely preferred ones of the invention, and are not intended to limit the invention. Various modification and transformations may be made by those skilled in the art. Any amendments, equivalent substitutions and improvements made based on the spirit and principle of the invention should also fall within the protection scope of the invention.

What is claimed is:

1. A novel portable mosquito dispeller, comprising a shell (11), wherein a battery case (10) is fixedly mounted in the shell (11), a battery (9) is received in the battery case (10), a lower portion of the battery case (10) is flat, a base (14) is screwed at a bottom of the shell (11) such that receiving cavities (16) for receiving mosquito-repellent mats are defined by the battery case (10), the shell (11) and the base (14), first studs (101) and second studs (102) which are integrally formed upwards are disposed on an upper portion of the battery case (10), a circuit board (5) is fixedly connected to the first studs (101) with screws and is provided with atmosphere lights (6), an indicator light (7) and a switch button (8), a top cover (1) is fixed to the second studs (102) with screws to mount a PTC heating element/heating film bracket (4) between the circuit board (5) and the top cover (1), and a PTC heating element/heating film (2) electrically connected to the circuit board (5) is disposed in the PTC heating element/heating film bracket (4).

2. The novel portable mosquito dispeller according to claim 1, wherein the battery (9) is wrapped with fireproof asbestos and is mounted in the battery case (10) in a close fit manner.

3. The novel portable mosquito dispeller according to claim 1, wherein a non-slip gasket (15) is disposed on a lower surface of the base (14).

4. The novel portable mosquito dispeller according to claim 1, wherein the shell (11) is provided with an indicator light cover (12) and a key (13), the indicator light cover (12) corresponds to the indicator light (7) in position, and the key (13) corresponds to the switch button (8) in position.

5. The novel portable mosquito dispeller according to claim 4, wherein the indicator light cover (12) is close to the key (13), and the shell (11) is provided with a charging port opposite to the key (13).

6. The novel portable mosquito dispeller according to claim 1, wherein colored light covers (3) are disposed at positions, corresponding to the atmosphere lights (6), of the PTC heating element/heating film bracket (4), and are fastened on the PTC heating element/heating film bracket (4) in a hooked manner.

7. The novel portable mosquito dispeller according to claim 1, wherein the top cover (1) is provided with a through hole (1a) allowing the mosquito-repellent mats to be placed therein, and multiple diffusion holes (1b) are machined in a top surface of the top cover (1).

* * * * *